June 9, 1942.          W. M. STOCKER          2,285,846
SLITTING DEVICE
Filed May 2, 1941          5 Sheets-Sheet 1

INVENTOR.
William M. Stocker
BY
ATTORNEY

June 9, 1942.  W. M. STOCKER  2,285,846
SLITTING DEVICE
Filed May 2, 1941   5 Sheets-Sheet 2
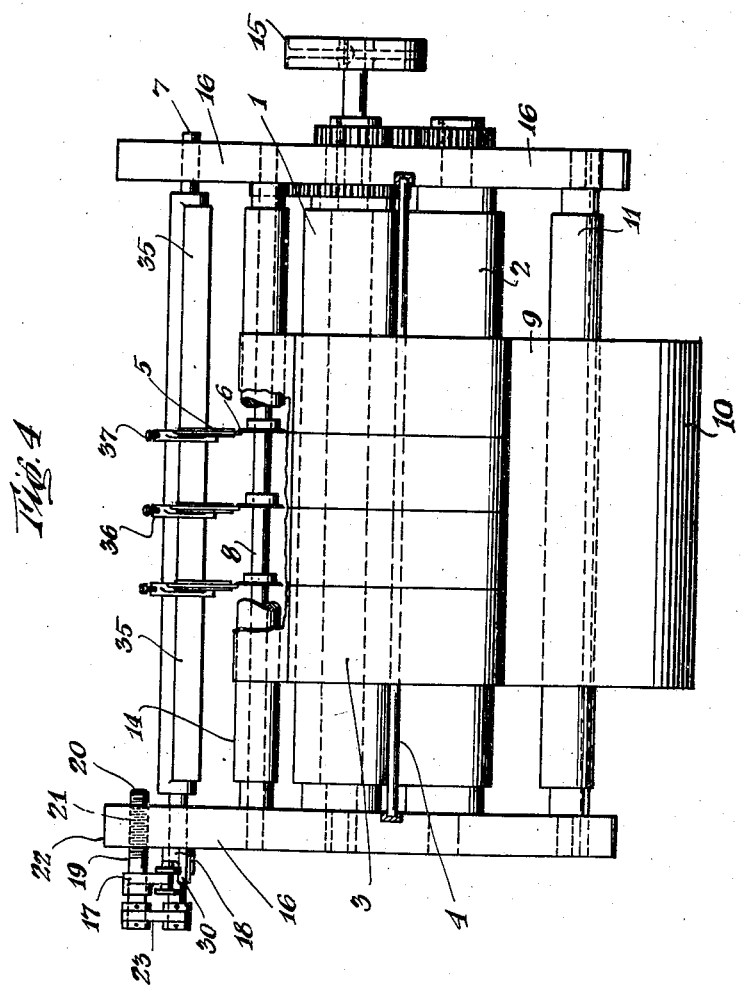
INVENTOR.
William M. Stocker
BY
ATTORNEY

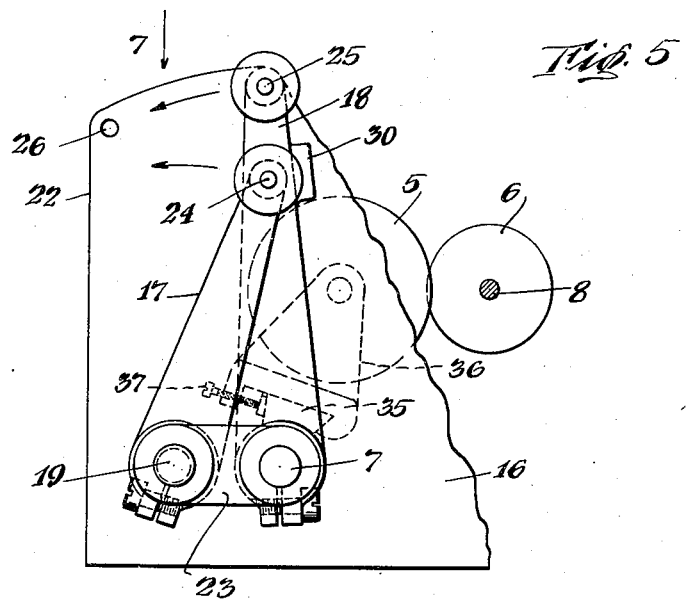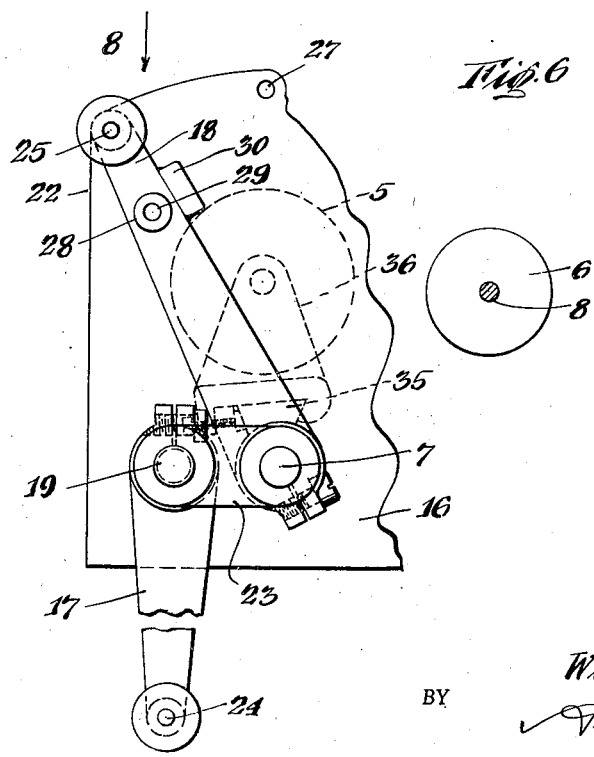

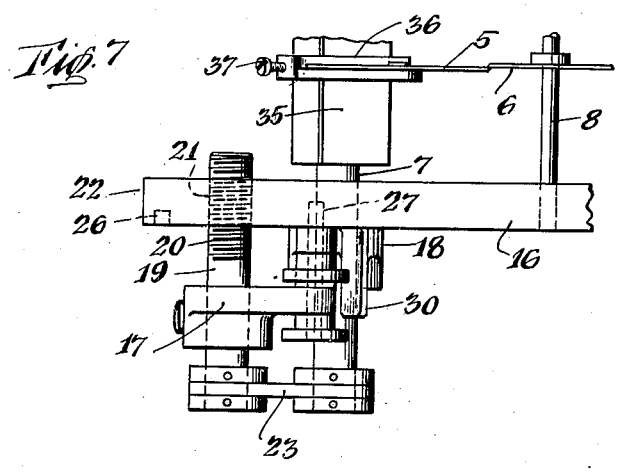
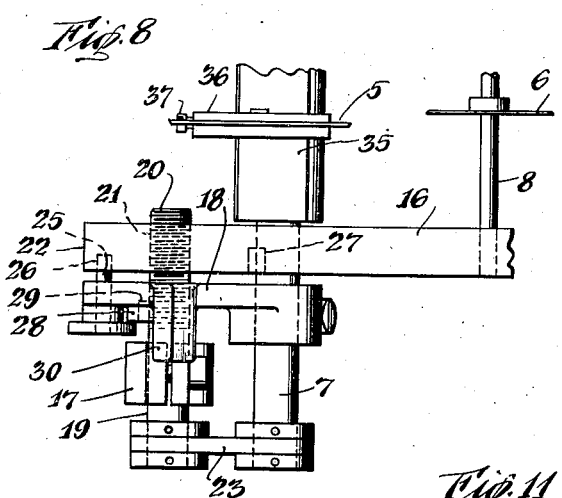
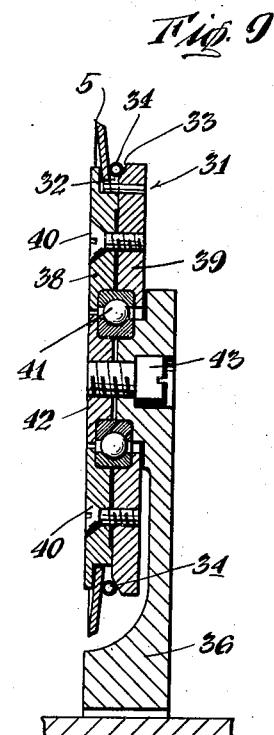
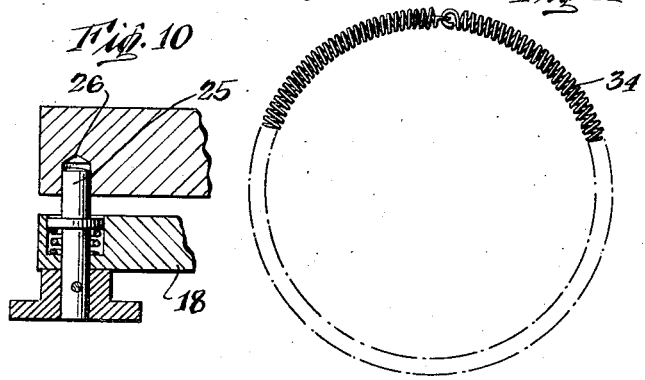
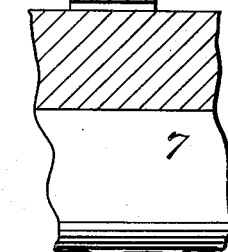
INVENTOR.
William M. Stocker

June 9, 1942. W. M. STOCKER 2,285,846
SLITTING DEVICE
Filed May 2, 1941 5 Sheets-Sheet 5
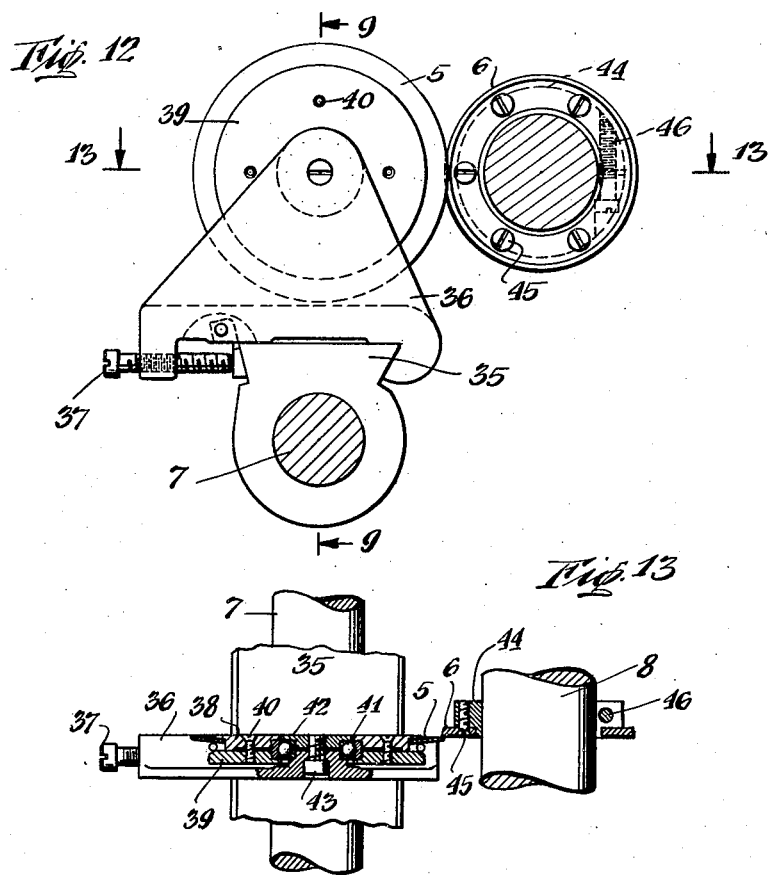
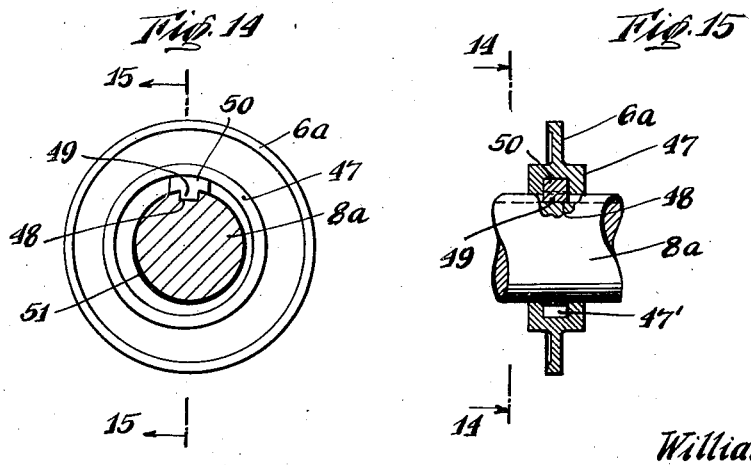
INVENTOR.
William M. Stocker
BY
ATTORNEY Patented June 9, 1942

2,285,846

UNITED STATES PATENT OFFICE 2,285,846

SLITTING DEVICE

William M. Stocker, Hollis, N. Y., assignor to Cameron Machine Company, Brooklyn, N. Y., a corporation of New York Application May 2, 1941, Serial No. 391,462

5 Claims. (Cl. 164—65)

This invention relates to slitting devices of the shear-cut type in which rotatable and circular shears engage sidewise, under spring pressure, in overlapping relation, and the main object and feature of the invention is to prevent interference with each other of the cutting edges of said shears when engaging or disengaging said shears.

In the accompanying drawings

Fig. 4 is a top plan view of the machine looking in the direction of arrow 4 of Fig. 1;

Fig. 5 is a view, on an enlarged scale, in side elevation showing the interlocking means in the position they occupy when the slitting elements are in engagement;

Fig. 6 is a view similar to Fig. 5 but showing the interlocking means in the position they occupy when the slitting elements are out of engagement;

Fig. 7 is a top plan view looking in the direction of arrow 7 of Fig. 5;

Fig. 8 is a top plan view looking in the direction of arrow 8 of Fig. 6;

Fig. 9 is a vertical sectional view, on an enlarged scale, substantially on the plane of line 9—9 of Fig. 12;

Fig. 10 is a detail sectional view of one of the spring latches used in connection with the invention;

Fig. 11 is a view partly in elevation and partly diagrammatic of the endless spring loop used in connection with one of the shear cutters;

Fig. 12 is a view in side elevation of the slitting elements;

Fig. 13 is a horizontal sectional view substantially on the plane of line 13—13 of Fig. 12;

Fig. 14 is a vertical sectional view substantially on the plane of line 14—14 of Fig. 15 showing a modified form of shear cutter mounting; and Fig. 15 is a vertical sectional view substantially on the plane of line 15—15 of Fig. 14.

Figure 1:
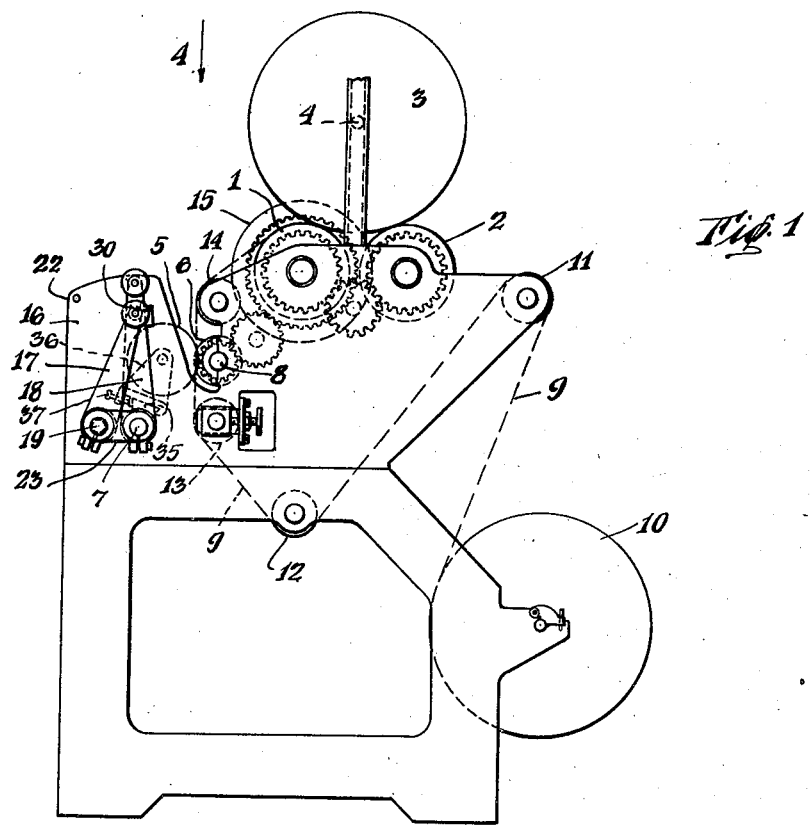
Fig. 1 is a view in side elevation of a machine embodying a preferred form of the invention.
Figures 2, 3:
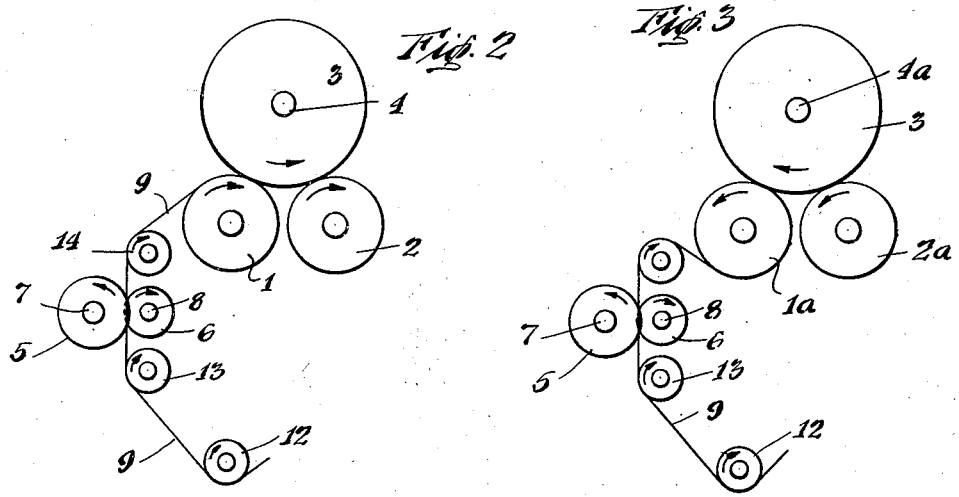
Figs. 2 and 3 are diagrammatic views showing different methods of threading the web.

The slitting device may and usually will constitute a part of a winding machine. Such winding machine may be of any type. The invention is here shown in connection with a surface winding machine. Referring more particularly to Figs. 1 to 4 inclusive, 1 and 2 indicate two surface winding drums on which rests wound material 3 carried by winding shaft 4. The rotatable overlapping shears are shown at 5 and 6 and it will be understood that there are usually two groups of such shears. As here shown, shears 5 constitute one group and shears 6 the other group. Shears 5 are carried by a support or shaft 7, and shears 6 are mounted on a shaft 8. Web 9 is here taken from a web roll 10 and travels over guide rollers 11, 12 and 13. It then passes between shears 5 and 6, over guide roller 14 and thence (Fig. 2) over front winding drum 1, to rear winding drum 2 and winding shaft 4. It will, of course, be understood that the threading of the web just described is by way of example. It could be threaded differently, as, for instance, shown in Fig. 3 in which web 9 passes beneath front winding drum 1a, thence between winding drums 1a and 2a and after that to winding shaft 4a. In such case, the direction of rotation of the winding drums is reversed, as indicated by the arrows, and this may be done in the manner disclosed in Patent No. 2,233,755, dated March 4, 1941, without reversing the direction of rotation of the shears. Power is here applied to the front winding drum as by means of pulley 15 and, from said front winding drum, the rear winding drum and shear cutter shaft 8 are driven by gearing in a well-understood manner. Shears 5 are driven by frictional engagement with shears 6.

Referring now particularly to Figs. 4 to 8 inclusive and Fig. 10, shaft or support 7 is mounted to have two movements, one to bring the shears of the two groups into and out of sidewise engagement, and, another, to bring the shears of the two groups into and out of overlapping relation. In the present instance, said shaft 7 is mounted to have a sliding endwise and a turning movement in framework 16. Suitable operating elements, here represented by levers or handles 17 and 18, are employed to separately effect the aforesaid movements. In this instance, lever 18 is clamped directly to shaft 7, so that movement of said lever turns the shaft. Lever 17, on the other hand, is clamped to a stub shaft 19 having a threaded portion 20 in engagement with threaded opening 21 of an abutment or portion 22 of the framework. Suitable means, such as yoke or link 23, connect shaft 7 and stub shaft 19. It will now be apparent that, when lever 17 is moved, stub shaft 19 will turn and, depending upon the direction of the turning movement, stub shaft 19 will move endwise and that, by reason of link 23, it will carry shaft 7 endwise with it. Suitable interengageable means are provided which by their interengagement prevent effective movement of lever 17 and 18 except in a predetermined sequence which, in the present instance, take the following form:

each lever carries a spring-pressed latch or detent 24 and 25, a sectional view of one of these (25) being shown in Fig. 10. The framework is provided with two openings 26 and 27 with either of which latch 25 will engage, depending upon the position lever 18 occupies. When latch 25 engages opening 27, the shears are in overlapping relation, and when it engages opening 26 the shears are in non-overlapping relation. Lever 18 is provided with a boss 28 having an opening 29 with which latch 24 engages when the shears are in sidewise engagement. It will now be understood that, when it is desired to bring the shears of the two groups into engagement, lever 18 is moved from the position defined by opening 26 into the position defined by opening 27 thereby bringing the shears of the two groups into overlapping relation. Lever 17 is then moved to bring latch 24 into engagement with opening 29 of lever 18 thereby bringing the shears of the two groups into sidewise engagement. It will be observed, however, that, if it be attempted to move lever 17 to bring the shears of the two groups into sidewise engagement while latch 25 is locked in opening 26, then such attempted movement will be ineffective because stop 30 on lever 18 will prevent effective movement of lever 17. So, likewise, spring latch 24, unless it has been withdrawn will come in contact with boss 28 whereby further movement of lever 17 will be prevented. When it is desired to separate the shears, lever 17 is first released from engagement with lever 18 and is then turned to bring the shears of the two groups out of engagement sidewise, after which lever 18 is brought from position 27 to position 26 to move the shears of the two groups out of overlapping relation. It will be noted, however, that if it be attempted to move lever 18 first, before releasing lever 17, such attempt will be ineffective because lever 17 holds lever 18 locked in position.

Shear cutter 5 can be of any suitable construction but, preferably, involves the new features of construction shown in Fig. 9. 31 indicates a cutter holder having a circumferential groove 32 provided with an inwardly tapering wall 33. The circular blade on shear 5 is seated in said groove and an endless spring loop 34 is also seated in said groove between the blade or shear and the tapering wall. It will be understood that said loop tends to contract and thus urges the shear toward the other wall of the groove or toward its cooperating shear 6 (Fig. 13) under yielding pressure. Thus each holder has resilient means to urge its shear 5 of one group in a direction parallel to the axis of supporting shaft 7 and sidewise toward a shear 6 of the other group.

Shaft 7, here, carries a spacer bar 35 (Figs. 12 and 13) on which can be adjustably mounted a plurality of shear cutters as 5 (Fig. 4). Preferably, the mounting of each shear cutter includes a standard 36 adjustably secured to said spacer bar as by set screw 37. Cutter holder 31 is here composed of two plates 38 and 39 secured together by screws 40. The cutter holder rotates on ball bearings 41 interposed between it and standard 36 and plate 42, the latter being secured to the standard by means of screw 43.

Shear cutter 6 may be constructed as shown in Figs. 12 and 13 in which the blade is attached to a split collar 44 by means of screws 45, said collar being clamped to shaft 8 by set screw 46. An alternative method of attaching shear cutter 6 to shaft 8 is shown in Figs. 14 and 15. As there shown shear cutter 6a is provided with a hub 47 that has an inner circumferential groove 47' that is eccentric to shaft 8a and in spaced relation thereto. Shaft 8a is provided with a lengthwise extending groove 48 in which is seated the tail 49 of wedge block 50, said block being within the circumferential groove of the hub. A spring 51 surrounds shaft 8a within said circumferential groove, and its ends extend between said shaft 8a and block 50 and press against tail 49. It will now be apparent that rotation of shaft 8a to the right in Fig. 14 will carry block 50 into wedging position and will carry shear cutter 6a with it. If it be desired to disengage the parts after the machine is stopped it is only necessary to turn the shaft to the left (in Fig. 14) while holding the cutter stationary, after which the shear cutter can be moved lengthwise of the shaft.

I claim:

1. In a slitting device in which two rotatable and circular shears engage sidewise under spring pressure in overlapping relation, the combination with a supporting member for one of said shears mounted to have two movements, one to bring the shears into and out of sidewise engagement and another to bring the shears into and out of overlapping relation, operating elements to separately effect said movements of said supporting member, and interengageable means associated with said elements which by their interengagement prevent movement of said member to bring the shears out of overlapping relation until after they have been brought out of sidewise engagement, and to prevent movement of said member to bring the shears into sidewise engagement until after the shears have been brought into overlapping relation.

2. In a slitting device in which two rotatable and circular shears engage sidewise under spring pressure in overlapping relation, the combination with a supporting member for one of said shears mounted to have two movements, one, an endwise movement to bring the shears into and out of sidewise engagement and, another, a turning movement to bring the shears into and out of overlapping relation, operating elements to separately effect said movements of said supporting member, and interengageable means associated with said elements which by their interengagement prevent turning movement of said member to bring the shears out of overlapping relation until after said member has been moved endwise and the shears have been brought out of sidewise engagement, and to prevent endwise movement of said member to bring the shears into sidewise engagement until after the shears have been brought into overlapping relation.

3. In a slitting device in which two rotatable and circular shears engage sidewise under spring pressure in overlapping relation, the combination with a supporting member for one of said shears mounted to have two movements, one to bring the shears into and out of sidewise engagement and another to bring the shears into and out of overlapping relation, operating elements to separately effect said movements of said supporting member, and interengageable means associated with said elements which by their interengagement prevent, when separating the shears, effective movement of one of said elements until after the other of said elements has been effectively moved, and to prevent, when bringing the shears together, effective movement of said other element until said first one has been effectively moved.

4. In a slitting device in which two rotatable and circular shears engage sidewise under spring pressure in overlapping relation, and in which a shaft that supports one of said shears is mounted to have both an endwise and a turning movement to bring the shears into and out of engagement, the combination with said shaft, of a stub shaft in threaded engagement with a threaded opening in a stationary abutment and which, when rotated, moves endwise, means connecting the two shafts so that an endwise movement of the stub shaft carries the first-mentioned shaft with it, a handle on the first-mentioned shaft to effect turning movement thereof, a handle on the stub shaft to effect turning movement thereof, and interengageable means on the two handles which by their interengagement prevent effective operation of said handles except in a predetermined sequence with respect to each other.

5. In a slitting device in which two groups of rotatable and circular shears engage sidewise under spring pressure in overlapping relation, the combination with a supporting shaft for one of said groups of shears, said shaft mounted to have two movements, one an endwise movement to bring the shears of the two groups into and out of sidewise engagement and, another, a turning movement to bring the shears of the two groups out of overlapping relation, a plurality of holders carried by said supporting shaft, a group of shears, one shear mounted in each holder, resilient means to individually urge each shear of said group in a direction parallel to the axis of the supporting shaft and sidewise toward a cutter of the other group, operating elements to separately effect said movements of said supporting shaft, and interengageable means associated with said elements which by their interengagement prevent movement of said supporting shaft to bring the shears of the two groups out of overlapping relation until after they have been brought out of sidewise engagement, and to prevent movement of said supporting shaft to bring the shears of the two groups into sidewise engagement until after they have been brought into overlapping relation.

WILLIAM M. STOCKER.